(12) United States Patent
Tokuda et al.

(10) Patent No.: US 11,833,795 B2
(45) Date of Patent: Dec. 5, 2023

(54) MULTILAYER BODY AND METHOD FOR PRODUCING FLEXIBLE DEVICE

(71) Applicant: TOYOBO CO., LTD., Osaka (JP)

(72) Inventors: Kaya Tokuda, Otsu (JP); Tetsuo Okuyama, Otsu (JP); Satoshi Maeda, Otsu (JP); Naoki Watanabe, Otsu (JP); Harumi Yonemushi, Otsu (JP); Denichirou Mizuguchi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/996,745

(22) PCT Filed: Jun. 9, 2021

(86) PCT No.: PCT/JP2021/021947
§ 371 (c)(1),
(2) Date: Oct. 20, 2022

(87) PCT Pub. No.: WO2022/018994
PCT Pub. Date: Jan. 27, 2022

(65) Prior Publication Data
US 2023/0150252 A1    May 18, 2023

(30) Foreign Application Priority Data
Jul. 21, 2020   (JP) .................................. 2020-124589
Jul. 21, 2020   (JP) .................................. 2020-124591

(51) Int. Cl.
*B32B 37/02*    (2006.01)
*B32B 7/022*    (2019.01)
(Continued)

(52) U.S. Cl.
CPC .............. *B32B 37/02* (2013.01); *B32B 7/022* (2019.01); *B32B 7/06* (2013.01); *B32B 9/045* (2013.01);
(Continued)

(58) Field of Classification Search
CPC ............ B32B 17/10; B32B 2037/0092; B32B 2307/306; B32B 2307/51;
(Continued)

(56) References Cited

U.S. PATENT DOCUMENTS

2012/0228617 A1   9/2012  Ko et al.
2021/0308987 A1   10/2021 Okuyama et al.

FOREIGN PATENT DOCUMENTS

JP    2007-512568 A    5/2007
JP    2012-189974 A    10/2012
(Continued)

OTHER PUBLICATIONS

Japan Patent Office, International Search Report in International Patent Application No. PCT/JP2021/021947 (dated Aug. 24, 2021).
(Continued)

*Primary Examiner* — Sonya M Sengupta
(74) *Attorney, Agent, or Firm* — Leydig, Voit & Mayer, Ltd.

(57) ABSTRACT

The invention provides a multilayer body of an inorganic substrate and a highly heat-resistant film, wherein the surface of the inorganic substrate is sufficiently smooth after removal of the highly heat-resistant film from the multilayer body, and the inorganic substrate is re-usable. The multilayer body uses substantially no adhesive and is characterized by
(1) a tensile elastic modulus of the highly heat-resistant film of 4 GPa or more,
(2) a bonding strength between the highly heat-resistant film and the inorganic substrate of 0.3 N/cm or less,
(3) a surface roughness Ra of a surface of the highly heat-resistant film, said surface being in contact with the inorganic substrate, of 5 nm or less, and
(Continued)

(4) a surface roughness Ra of the surface of the inorganic substrate after removal of the highly heat-resistant film from the multilayer body of 3 nm or less.

4 Claims, 1 Drawing Sheet

(51) Int. Cl.
　　*B32B 7/06*　　　(2019.01)
　　*B32B 9/04*　　　(2006.01)
　　*B32B 27/28*　　　(2006.01)
　　*B32B 38/10*　　　(2006.01)
　　*B32B 37/00*　　　(2006.01)

(52) U.S. Cl.
　　CPC ............ *B32B 27/281* (2013.01); *B32B 38/10* (2013.01); *B32B 2037/0092* (2013.01); *B32B 2307/306* (2013.01); *B32B 2307/51* (2013.01); *B32B 2307/538* (2013.01); *B32B 2307/748* (2013.01); *B32B 2457/00* (2013.01)

(58) Field of Classification Search
　　CPC ........ B32B 2307/538; B32B 2307/748; B32B 2457/00; B32B 27/281; B32B 37/02; B32B 38/10; B32B 7/022; B32B 7/06; B32B 9/045; C03C 17/30
　　See application file for complete search history.

(56) References Cited

FOREIGN PATENT DOCUMENTS

| | | |
|---|---|---|
| JP | 2013-010342 A | 1/2013 |
| JP | 2014-086451 A | 5/2014 |
| JP | 2014-100722 A | 6/2014 |
| JP | 2014-120664 A | 6/2014 |
| JP | 2016-120663 A | 7/2016 |
| JP | 2017-124587 A | 7/2017 |
| WO | WO 2005/050754 A1 | 6/2005 |
| WO | WO 2012/050072 A1 | 4/2012 |
| WO | WO 2020/039928 A1 | 2/2020 |

OTHER PUBLICATIONS

Japan Patent Office, Written Opinion of the International Searching Authority in International Patent Application No. PCT/JP2021/021947 (dated Aug. 24, 2021).

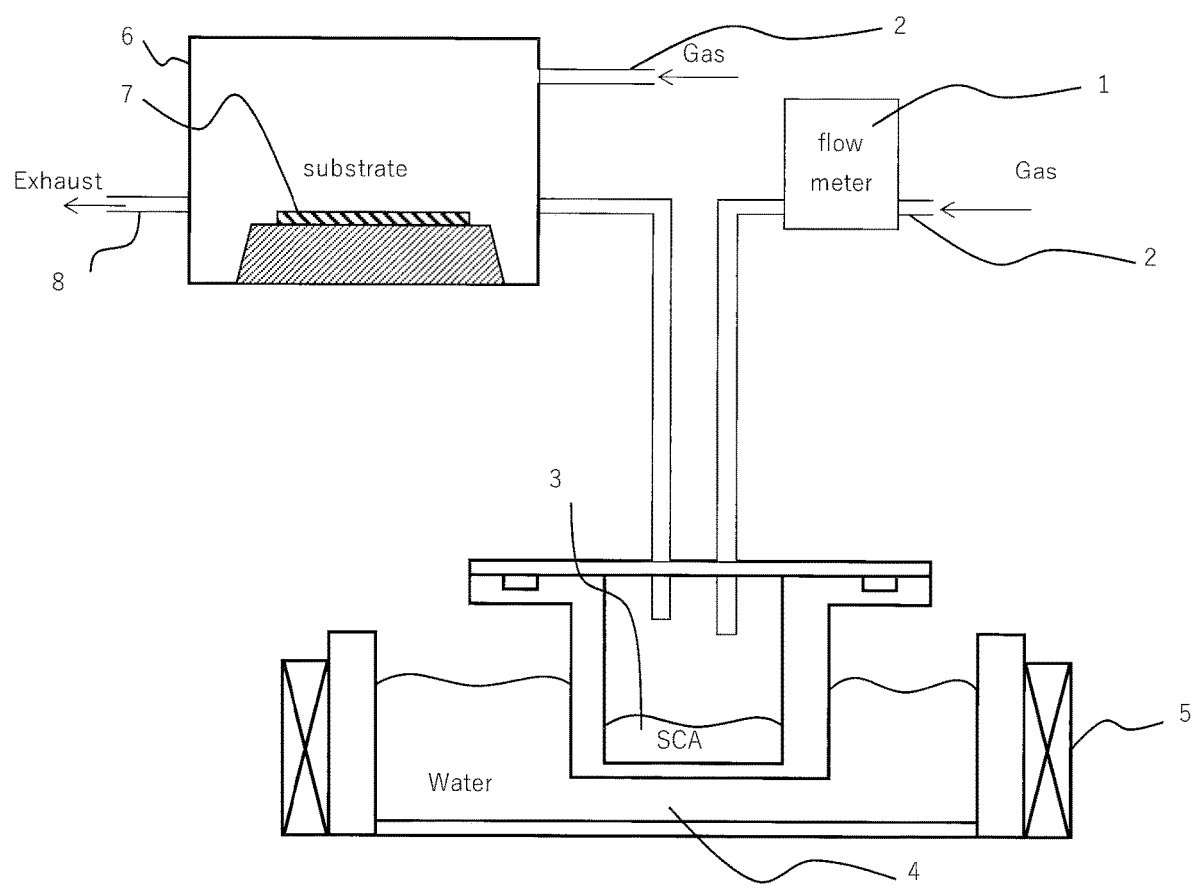

MULTILAYER BODY AND METHOD FOR PRODUCING FLEXIBLE DEVICE

TECHNICAL FIELD

The present invention relates to a laminate in which a highly heat-resistant film of a polyimide-based resin or the like is formed on an inorganic substrate, and a method for manufacturing a flexible device. The laminate of the present invention is useful, for example, when a flexible device and a flexible wiring board in which an electronic element is formed on the surface of a flexible substrate are manufactured.

BACKGROUND ART

Conventionally, in the field of flat panel displays (FPDs) such as liquid crystal displays (LCDs), plasma display panels (PDPs), and organic EL displays (OLEDs) and electronic devices such as electronic papers, those in which an electronic element is formed on a substrate (inorganic substrate) formed of an inorganic material such as a glass substrate are mainly used. However, inorganic substrates are rigid and lack flexibility, and there is thus a problem that it is difficult to make inorganic substrates flexible.

Hence, a method in which an organic polymer material such as polyimide exhibiting flexibility and heat resistance is used as a substrate has been proposed. In other words, a technique in which a highly heat-resistant film exhibiting flexibility is laminated on an inorganic substrate used as a carrier and this highly heat-resistant film is utilized as a substrate or a wiring board for forming an electronic element has been put into practical use. Here, for example, when a glass substrate exhibiting excellent light transmitting properties is used as an inorganic substrate, the inspection process at the time of electronic element formation and at the time of wiring board fabrication is easy as well as there is an advantage that the existing facility for producing flexible devices in which electronic elements are formed on glass substrates can be utilized as it is.

In such an inorganic substrate on which a flexible substrate layer formed from a highly heat-resistant film is laminated, the inorganic substrate is utilized as a substrate for carrier, it is thus required to form an electronic element on the surface of the highly heat-resistant film and then finally peel off and separate the highly heat-resistant film from the inorganic substrate. Accordingly, favorable peeling properties are required after the formation of electronic element.

As a method for industrially peeling off a highly heat-resistant film that is firmly attached to an inorganic substrate from the inorganic substrate, for example, a method to perform peeling off by a method in which the interface of a highly heat-resistant film such as a polyimide-based resin in contact with a glass substrate is irradiated with laser light (Patent Document 1), a method in which the interface of a polyimide film in contact with a glass substrate is heated with Joule heat (Patent Document 2), a method in which induction heating is performed (Patent Document 3), a method in which irradiation is performed with flash light from a xenon lamp (Patent Document 4) or the like has been proposed. However, these methods have problems that the process is complicated and requires a long time, the facility is expensive so that the cost is high, and also it is difficult to reuse the inorganic substrate.

Therefore, a method has been proposed in which an inorganic substrate and a highly heat-resistant film are attached to each other with relatively weak force using a silane coupling agent to facilitate peeling off of the highly heat-resistant film from the inorganic substrate (Patent Document 5).

PRIOR ART DOCUMENTS

Patent Documents

Patent Document 1: JP-W-2007-512568
Patent Document 2: JP-A-2012-189974
Patent Document 3: JP-A-2014-86451
Patent Document 4: JP-A-2014-120664
Patent Document 5: JP-A-2014-100722

DISCLOSURE OF THE INVENTION

Problems to be Solved by the Invention

The surface of an inorganic substrate from which a highly heat-resistant film has been peeled off by a method as disclosed in Patent Document 5 is smooth, and it is easy to reuse the inorganic substrate. However, the above-mentioned method in which a silane coupling agent is used has a problem that when the elastic modulus of the highly heat-resistant film is low, the highly heat-resistant film is deformed and broken at the peeling interface when being peeled off from the inorganic substrate, the surface of the inorganic substrate is roughened after the highly heat-resistant film is peeled off, and it is difficult to reuse the inorganic substrate.

Hence, the present invention is intended to solve the above-mentioned problems, and an object thereof is to provide a laminate in which the surface of an inorganic substrate is sufficiently smooth after a highly heat-resistant film is peeled off from a laminate of the inorganic substrate and the highly heat-resistant film and the inorganic substrate can be thus reused.

Means for Solving the Problems

The present inventors have diligently studied to solve the above-mentioned problems, as a result, have found out that the above-mentioned problems can be solved when a highly heat-resistant film to be laminated on an inorganic substrate has a specific elastic modulus and the peel strength between the inorganic substrate and the heat-resistant resin film is a certain value or less, and have completed the present invention.

In other words, the present invention has the following configurations.

[1] A first laminate of a first highly heat-resistant film and an inorganic substrate, in which an adhesive is not substantially used and the first laminate has the following features (1) to (4):
(1) a tensile elasticity of the first highly heat-resistant film is 4 GPa or more;
(2) an adhesive strength between the first highly heat-resistant film and the inorganic substrate is 0.3 N/cm or less;
(3) a surface roughness Ra of a surface in contact with the inorganic substrate of the first highly heat-resistant film is 5 nm or less; and
(4) a surface roughness Ra of a surface of the inorganic substrate after the first highly heat-resistant has been peeled off film from the first laminate is 3 nm or less.

[2] The laminate according to [1], which further has the following feature (5):
(5) a nitrogen element component ratio on a surface to be bonded to the first highly heat-resistant film of the inorganic substrate is 0.2 at % or more and 12 at % or less.

[3] The first laminate according to [1] or [2], in which a CTE of the first highly heat-resistant film is 50 ppm/K or less.

[4] A method for manufacturing a second laminate, the method including:
(a) a step of peeling off a first highly heat-resistant film from the first laminate according to any one of [1] to [3] to obtain an inorganic substrate; and
(b) a step of laminating a second highly heat-resistant film on a surface on which the first highly heat-resistant film has been laminated of the inorganic substrate to obtain a second laminate, in which the method has the following features (6) to (9):
(6) a tensile elasticity of the second highly heat-resistant film is 4 GPa or more;
(7) an adhesive strength between the second highly heat-resistant film and the inorganic substrate is 0.3 N/cm or less;
(8) a surface roughness Ra of a surface in contact with the inorganic substrate of the second highly heat-resistant film is 5 nm or less; and
(9) a surface roughness Ra of a surface of the inorganic substrate after the second highly heat-resistant has been peeled off film from the second laminate is 3 nm or less.

[5] The method for manufacturing a second laminate according to [4], which further has the following feature (10):
(10) a nitrogen element component ratio on a surface to be bonded to the second highly heat-resistant film of the inorganic substrate is 0.2 at % or more and 12 at % or less.

[6] The method for manufacturing a second laminate according to [4] or [5], in which a CTE of the second highly heat-resistant film is 50 ppm/K or less.

[7] The method for manufacturing a flexible electronic device, the method including:
(c) a step of forming an electronic element or wiring on a surface of a second highly heat-resistant film and then peeling off an inorganic substrate
after the second laminate according to any one of [4] to [6] is obtained.

Effect of the Invention

In the laminate and the method for manufacturing a laminate of the present invention, since the highly heat-resistant film can be easily peeled off from the inorganic substrate and the surface of the inorganic substrate after the highly heat-resistant film is peeled off is sufficiently smooth, the inorganic substrate can be utilized repeatedly.

BRIEF DESCRIPTION OF THE DRAWINGS

FIG. 1 is a schematic diagram illustrating an example of a silane coupling agent applying apparatus according to an embodiment of the present invention.

MODE FOR CARRYING OUT THE INVENTION

Hereinafter, embodiments of the present invention will be described.

<Highly Heat-Resistant Film>

In the present invention, the highly heat-resistant film is a general term for the first highly heat-resistant film and the second highly heat-resistant film unless otherwise specified. The first highly heat-resistant film and the second highly heat-resistant film may be films having the same composition or films having different compositions. The first highly heat-resistant film and the second highly heat-resistant film are preferably films having the same composition. The highly heat-resistant film has a single-layer or multi-layer structure (laminated configuration), and preferably has a multi-layer structure of two or more layers from the viewpoint of physical strength and easy peeling properties from the inorganic substrate. When the highly heat-resistant film has a multi-layer structure, the number of layers may be two or more and is preferably three or more. The number of layers is preferably 10 or less, more preferably 5 or less. When the highly heat-resistant film has a multi-layer structure, the respective layers may be film layers having the same composition or film layers having different compositions. The respective layers are preferably film layers having the same composition. It is also preferable to have a symmetrical structure in the thickness direction.

The highly heat-resistant film is a film having a melting point of preferably 250° C. or more, more preferably 300° C. or more, still more preferably 400° C. or more. The highly heat-resistant transparent film is a film formed from a polymer having a glass transition temperature of preferably 200° C. or more, more preferably 320° C. or more, still more preferably 380° C. or more. Hereinafter, the highly heat-resistant transparent film is also simply referred to as a polymer in order to avoid complication. In the present specification, the melting point and the glass transition temperature are determined by differential thermal analysis (DSC). In a case where the melting point exceeds 500° C., it may be determined whether or not the temperature has reached the melting point by visually observing the thermal deformation behavior when the highly heat-resistant transparent film is heated at this temperature. When the highly heat-resistant film has a multi-layer structure, the melting point means the measured value of the entire highly heat-resistant film (all layers constituting the multi-layer structure).

Examples of the highly heat-resistant film (hereinafter, also simply referred to as a polymer film) include films of polyimide-based resins (for example, aromatic polyimide resin and alicyclic polyimide resin) such as polyimide, polyamide-imide, polyetherimide, and fluorinated polyimide; copolymerized polyesters (for example, fully aromatic polyester and semi-aromatic polyester) such as polyethylene, polypropylene, polyethylene terephthalate, polybutylene terephthalate, and polyethylene-2,6-naphthalate; copolymerized (meth)acrylates typified by polymethyl methacrylate; polycarbonate; polyamide; polysulfone; polyether sulfone; polyether ketone; cellulose acetate; cellulose nitrate; aromatic polyamide; polyvinyl chloride; polyphenol; polyarylate; polyacetal; modified polyphenylene ether; polyphenylene sulfide; polyphenylene oxide; polystyrene; polybenzoxazole; polybenzothiazole; polybenzimidazole; cyclic polyolefin; liquid crystal polymer; and the like. Examples of the highly heat-resistant transparent film also include those obtained by reinforcing these with glass fillers, glass fibers and the like.

However, since the polymer film is premised on being used in a process involving heat treatment at 250° C. or more, those that can actually be adopted among the exemplified polymer films are limited. Among the polymer films, a film obtained using a so-called super engineering plastic is preferable, and more specific examples thereof include an aromatic polyimide film, an alicyclic polyimide film, an aromatic amide film, an aromatic amide-imide film, an amide-imide film, an aromatic benzoxazole film, an aromatic benzothiazole film, an aromatic benzimidazole film, a cyclic polyolefin, and a liquid crystal polymer.

Generally, a polyamide-imide film is obtained by applying a polyamide-imide solution obtained by a reaction between a diisocyanate and a tricarboxylic in a solvent to a support for polyamide-imide film fabrication, drying the solution to form a polyamide-imide film containing a solvent at, for example, 1 to 50% by mass, and further treating the polyamide-imide film containing a solvent at 1 to 50% by mass at a high temperature on the support for polyamide-imide fabrication or in a state of being peeled off from the support for drying.

Generally, a polyamide film is obtained by applying a polyamide solution obtained by a reaction between a diamine and a dicarboxylic acid in a solvent to a support for polyamide film fabrication, drying the solution to form a polyamide film containing a solvent at, for example, 1% to 50% by mass, and further treating the polyamide film containing a solvent at 1% to 50% by mass at a high temperature on the support for polyamide film fabrication or in a state of being peeled off from the support for drying.

<Polyimide Film>

The details of the polyimide-based resin film (referred to as a polyimide film in some cases) which is an example of the polymer film will be described below. Generally, the polyimide-based resin film is obtained by applying a polyamic acid (polyimide precursor) solution which is obtained by a reaction between a diamine and a tetracarboxylic acid in a solvent, to a support for polyimide film fabrication, drying the solution to form a green film (hereinafter also referred to as "precursor film" or "polyamic acid film"), and further treating the green film by heat at a high temperature on the support for polyimide film fabrication or in a state of being peeled off from the support to cause a dehydration ring-closure reaction. Here, the green film is a film of polyamic acid that contains a solvent and exhibits self-supporting properties. The solvent content in the green film is not particularly limited as long as self-supporting properties are exhibited, but is preferably 1% by mass or more, more preferably 5% by mass or more, still more preferably 10% by mass or more, yet still more preferably 20% by mass or more, particularly preferably 30% by mass or more. The solvent content in the green film is preferably 80% by mass or less, more preferably 70% by mass or less, still more preferably 60% by mass or less, particularly preferably 50% by mass or less.

For the application of the polyamic acid (polyimide precursor) solution, it is possible to appropriately use, for example, conventionally known solution application means such as spin coating, doctor blade, applicator, comma coater, screen printing method, slit coating, reverse coating, dip coating, curtain coating, and slit die coating. Since the method for forming a film by applying a polyamic acid solution has a wide range of material choices, the method is easily considered in order to find a material preferable for easy peeling off, but on the other hand, it is required to control the imidization reaction in the method. In contrast, film formation that does not involve an imidization reaction has an advantage that film formation is easy, and it is thus required to use the methods properly.

The polyimide film in the present invention is a polymer film having an imide bond in the main chain, and is preferably a polyimide film and a polyamide-imide film, more preferably a polyimide film. A polyamide film is also preferable.

Generally, a polyimide film is obtained by applying a polyamic acid (polyimide precursor) solution obtained by a reaction between a diamine and a tetracarboxylic acid in a solvent to a support for polyimide film fabrication, drying the solution to form a green film, and further treating the green film by heat at a high temperature on the support for polyimide film fabrication or in a state of being peeled off from the support to cause a dehydration ring-closure reaction as described above. As another method, a polyimide film is also obtained by applying a polyimide solution obtained by a dehydration ring-closure reaction between a diamine and a tetracarboxylic acid in a solvent to a support for polyimide film fabrication, drying the solution to form a polyimide film containing a solvent at, for example, 1% to 50% by mass, and further treating the polyimide film containing a solvent at 1% to 50% by mass at a high temperature on the support for polyimide film fabrication or in a state of being peeled off from the support for drying.

The diamines constituting the polyamic acid are not particularly limited, and aromatic diamines, aliphatic diamines, alicyclic diamines and the like which are usually used for polyimide synthesis can be used. From the viewpoint of heat resistance, aromatic diamines are preferable. The diamines can be used singly or in combination of two or more kinds thereof.

The diamines are not particularly limited, and examples thereof include oxydianiline (bis(4-aminophenyl) ether and para-phenylenediamine (1,4-phenylenediamine).

As tetracarboxylic acids constituting the polyamic acid, aromatic tetracarboxylic acids (including anhydrides thereof), aliphatic tetracarboxylic acids (including anhydrides thereof) and alicyclic tetracarboxylic acids (including anhydrides thereof), which are usually used for polyimide synthesis, can be used. In a case where these are acid anhydrides, the acid anhydrides may have one anhydride structure or two anhydride structures in the molecule, but one (dianhydride) having two anhydride structures in the molecule is preferable. The tetracarboxylic acids may be used singly or in combination of two or more kinds thereof.

The tetracarboxylic acid is not particularly limited, and examples thereof include pyrolimetic dianhydride and 3,3', 4,4'-biphenyltetracarboxylic dianhydride.

A highly heat-resistant transparent film, which is an example of the highly heat-resistant film in the present invention, will be described. Among other, the details of a transparent polyimide film will be described. As the transparency of transparent polyimide, it is preferable that the total light transmittance is 75% or more. The total light transmittance is more preferably 80% or more, still more preferably 85% or more, yet still more preferably 87% or more, particularly preferably 88% or more. The upper limit of the total light transmittance of the highly heat-resistant transparent film is not particularly limited, but is preferably 98% or less, more preferably 97% or less for use as a flexible electronic device.

Examples of the aromatic tetracarboxylic acids for obtaining a highly colorless and transparent polyimide in the present invention include tetracarboxylic acids such as 4,4'-(2,2-hexafluoroisopropyridene)diphthalic acid, 4,4'-oxydiphthalic acid, bis(1,3-dioxo-1,3-dihydro-2-benzofuran-5-carboxylic acid) 1,4-phenylene, bis(1,3-dioxo-1,3-dihydro-2-benzofuran-5-yl)benzene-1,4-dicarboxylate, 4,4'-[4,4'-(3-oxo-1,3-dihydro-2-benzofuran-1,1-diyl) bis(benzene-1,4-diyloxy)]dibenzene-1,2-dicarboxylic acid, 3,3',4,4'- benzophenonetetracarboxylic acid, 4,4'-[(3-oxo-1,3-dihydro-2-benzofuran-1,1-diyl) bis(toluene-2,5-diyloxy)]dibenzene-1,2-dicarboxylic acid, 4,4'-[(3-oxo-1,3-dihydro-2-benzofuran-1,1-diyl) bis(1,4-xylene-2,5-diyloxy)]dibenzene-1,2-dicarboxylic acid, 4,4'-[4,4'-(3-oxo-1,3-dihydro-2-benzofuran-1,1-diyl) bis(4-isopropyl-toluene-2,5-diyloxy)]dibenzene-1,2-dicarboxylic acid, 4,4'-[4,4'-(3-oxo-1,3-dihydro-2-benzofuran-1,1-diyl) bis(naphthalene-1,4-diyloxy)]dibenzene-1,2-dicarboxylic acid, 4,4'-[4,4'-(3H-2,1-benzoxathiol-1,1-dioxide-3,3-diyl) bis(benzene-1,4-diyloxy)]dibenzene-1,2-dicarboxylic acid, 4,4'-benzophenone tetracarboxylic acid, 4,4'-[(3H-2,1-benzoxathiol-1,1-dioxide-3,3-diyl) bis(toluene-2,5-diyloxy)]dibenzene-1,2-dicarboxylic acid, 4,4'-[(3H-2,1-benzoxathiol-1,1-dioxide-3,3-diyl) bis(1,4-xylene-2,5-diyloxy)]dibenzene-1,2-dicarboxylic acid, 4,4'-[4,4'-(3H-2,1-benzoxathiol-1,1-dioxide-3,3-diyl) bis(4-isopropyl-toluene-2,5-diyloxy)]dibenzene-1,2-dicarboxylic acid, 4,4'-[4,4'-(3H-2,1-benzoxathiol-1,1-dioxide-3,3-diyl) bis(naphthalene-1,4-diyloxy)]dibenzene-1,2-dicarboxylic acid, 3,3',4,4'-benzophenonetetracarboxylic acid, 3,3',4,4'-benzophenonetetracarboxylic acid, 3,3',4,4'-diphenylsulfonetetracarboxylic acid, 3,3',4,4'-biphenyltetracarboxylic acid, 2,3,3',4'-biphenyltetracarboxylic acid, pyromellitic acid, 4,4'-[spiro(xanthene-9,9'-fluorene)-2,6-diyl bis(oxycarbonyl)]diphthalic acid, and 4,4'-[spiro(xanthene-9,9'-fluorene)-3,6-diyl bis(oxycarbonyl)] diphthalic acid, and acid anhydrides thereof. Among these, dianhydrides having two acid anhydride structures are suitable, and particularly 4,4'-(2,2-hexafluoroisopropyridene)diphthalic dianhydride and 4,4'-oxydiphthalic dianhydride are preferable. The aromatic tetracarboxylic acids may be used singly or in combination of two or more kinds thereof. For obtaining high heat resistance, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

Examples of the alicyclic tetracarboxylic acids include tetracarboxylic acids such as 1,2,3,4-cyclobutanetetracarboxylic acid, 1,2,3,4-cyclopentanetetracarboxylic acid, 1,2,3,4-cyclohexanetetracarboxylic acid, 1,2,4,5-cyclohexanetetracarboxylic acid, 3,3',4,4'-bicyclohexyltetracarboxylic acid, bicyclo[2,2,1]heptane-2,3,5,6-tetracarboxylic acid, bicyclo[2,2,2]octane-2,3,5,6-tetracarboxylic acid, bicyclo[2,2,2]octo-7-ene-2,3,5,6-tetracarboxylic acid, tetrahydroanthracene-2,3,6,7-tetracarboxylic acid, tetradecahydro-1,4:5,8:9,10-trimethanoanthracene-2,3,6,7-tetracarboxylic acid, decahydronaphthalene-2,3,6,7-tetracarboxylic acid, decahydro-1,4:5,8-dimethanonaphthalene-2,3,6,7-tetracarboxylic acid, decahydro-1,4-ethano-5,8-methanonaphthalene-2,3,6,7-tetracarboxylic acid, norbornane-2-spiro-α-cyclopentanone-α'-spiro-2"-norbornane-5,5",6,6"-tetracarboxylic acid (also known as "norbornane-2-spiro-2'-cyclopentanone-5'-spiro-2"-norbornane-5,5",6,6"-tetracarboxylic acid"), methylnorbornane-2-spiro-α-cyclopentanone-α'-spiro-2"-(methylnorbornane)-5,5",6,6"-tetracarboxylic acid, norbornane-2-spiro-α-cyclohexanone-α'-spiro-2"-norbornane-5,5",6,6"-tetracarboxylic acid (also known as "norbornane-2-spiro-2'-cyclohexanone-6'-spiro-2"-norbornane-5,5",6,6"-tetracarboxylic acid"), methylnorbornane-2-spiro-α-cyclohexanone-α'-spiro-2"-(methylnorbornane)-5,5",6,6"-tetracarboxylic acid, norbornane-2-spiro-α-cyclopropanone-α'-spiro-2"-norbornane-5,5",6,6"-tetracarboxylic acid, norbornane-2-spiro-α-cyclobutanone-α'-spiro-2"-norbornane-5,5",6,6"-tetracarboxylic acid, norbornane-2-spiro-α-cycloheptanone-α'-spiro-2"-norbornane-5,5",6,6"-tetracarboxylic acid, norbornane-2-spiro-α-cyclooctanone-α'-spiro-2"-norbornane-5,5",6,6"-tetracarboxylic acid, norbornane-2-spiro-α-cyclononanone-α'-spiro-2"-norbornane-5,5",6,6"-tetracarboxylic acid, norbornane-2-spiro-α-cyclodecanone-α'-spiro-2"-norbornane-5,5",6,6"-tetracarboxylic acid, norbornane-2-spiro-α-cycloundecanone-α'-spiro-2"-norbornane-5,5",6,6"-tetracarboxylic acid, norbornane-2-spiro-α-cyclododecanone-α'-spiro-2"-norbornane-5,5",6,6"-tetracarboxylic acid, norbornane-2-spiro-α-cyclotridecanone-α'-spiro-2"-norbornane-5,5",6,6"-tetracarboxylic acid, norbornane-2-spiro-α-cyclotetradecanone-α'-spiro-2"-norbornane-5,5",6,6"-tetracarboxylic acid, norbornane-2-spiro-α-cyclopentadecanone-α'-spiro-2"-norbornane-5,5",6,6"-tetracarboxylic acid, norbornane-2-spiro-α-(methylcyclopentanone)-α'-spiro-2"-norbornane-5,5",6,6"-tetracarboxylic acid, and norbornane-2-spiro-α-(methylcyclohexanone)-α'-spiro-2"-norbornane-5,5",6,6"-tetracarboxylic acid, and acid anhydrides thereof. Among these, dianhydrides having two acid anhydride structures are suitable, particularly 1,2,3,4-cyclobutanetetracarboxylic dianhydride, 1,2,3,4-cyclohexanetetracarboxylic dianhydride, and 1,2,4,5-cyclohexanetetracarboxylic dianhydride are preferable, 1,2,3,4-cyclobutanetetracarboxylic dianhydride and 1,2,4,5-cyclohexanetetracarboxylic dianhydride are more preferable, and 1,2,3,4-cyclobutanetetracarboxylic dianhydride is still more preferable. These may be used singly or in combination of two or more kinds thereof. For obtaining high transparency, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

Examples of the tricarboxylic acids include aromatic tricarboxylic acids such as trimellitic acid, 1,2,5-naphthalenetricarboxylic acid, diphenyl ether-3,3',4'-tricarboxylic acid, and diphenylsulfone-3,3',4'-tricarboxylic acid, or hydrogenated products of the aromatic tricarboxylic acids such as hexahydrotrimellitic acid, and alkylene glycol bistrimellitates such as ethylene glycol bistrimellitate, propylene glycol bistrimellitate, 1,4-butanediol bistrimellitate, and polyethylene glycol bistrimellitate and monoanhydrides and esterified products thereof. Among these, monoanhydrides having one acid anhydride structure are suitable, and particularly trimellitic anhydride and hexahydrotrimellitic anhydride are preferable. These may be used singly or a plurality of these may be used in combination.

Examples of the dicarboxylic acids include aromatic dicarboxylic acids such as terephthalic acid, isophthalic acid, orthophthalic acid, naphthalenedicarboxylic acid, and 4,4'-oxydibenzenecarboxylic acid, or hydrogenated products of the aromatic dicarboxylic acids such as 1,6-cyclohexanedicarboxylic acid, and oxalic acid, succinic acid, glutaric acid, adipic acid, heptanedioic acid, octanedioic acid, azelaic acid, sebacic acid, undecadic acid, dodecanedioic acid, and 2-methylsuccinic acid and acid chlorides or esterified products thereof. Among these, aromatic dicarboxylic acids and hydrogenated products thereof are suitable, and particularly terephthalic acid, 1,6-cyclohexanedicarboxylic acid, and 4,4'-oxydibenzenecarboxylic acid are preferable. The dicarboxylic acids may be used singly or a plurality of these may be used in combination.

The diamines or isocyanates for obtaining the highly colorless and transparent polyimide in the present invention are not particularly limited, and it is possible to use aromatic diamines, aliphatic diamines, alicyclic diamines, aromatic diisocyanates, aliphatic diisocyanates, alicyclic diisocyanates and the like that are usually used in the polyimide synthesis, polyamide-imide synthesis, and polyamide synthesis. Aromatic diamines are preferable from the viewpoint of heat resistance, and alicyclic diamines are preferable from the viewpoint of transparency. When aromatic diamines having a benzoxazole structure are used, a high elastic modulus, low heat shrinkability, and a low coefficient of linear thermal expansion as well as high heat resistance can be exerted. The diamines and isocyanates may be used singly or in combination of two or more kinds thereof.

Examples of the aromatic diamines include: 2,2'-dimethyl-4,4'-diaminobiphenyl; 1,4-bis[2-(4-aminophenyl)-2-propyl]benzene; 1,4-bis(4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy)biphenyl; bis[4-(3-aminophenoxy)phenyl]ketone; bis[4-(3-aminophenoxy)phenyl]sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 4-amino-N-(4-aminophenyl)benzamide; 3,3'-diaminodiphenylether; 3,4'-diaminodiphenylether; 4,4'-diaminodiphenylether; 2,2'-trifluoromethyl-4,4'-diaminodiphenylether; 3,3'-diaminodiphenylsulfide; 3,4'-diaminodiphenylsulfide; 4,4'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenyl sulfone; 3,4'-diaminodiphenyl sulfone; 4,4'-diaminodiphenyl sulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis[4-(4-aminophenoxy)phenyl]sulfide; bis[4-(4-aminophenoxy)phenyl]sulfoxide; bis[4-(4-aminophenoxy)phenyl] sulfone; bis[4-(3-aminophenoxy)phenyl]ether; bis[4-(4-aminophenoxy)phenyl]ether; 1,3-bis[4-(4-aminophenoxy)benzoyl]benzene; 1,3-bis[4-(3-aminophenoxy)benzoyl]benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenyl sulfone; bis[4-{4-(4-aminophenoxy)phenoxy}phenyl] sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; 4,4'-[9H-fluorene-9,9-diyl]bisaniline (also known as "9,9-bis(4-aminophenyl)fluorene"); spiro(xanthene-9,9'-fluorene)-2,6-diyl bis(oxycarbonyl)]bisaniline; 4,4'-[spiro(xanthene-9,9'-fluorene)-2,6-diyl bis(oxycarbonyl)]bisaniline; and 4,4'-[spiro(xanthene-9,9'-fluorene)-3,6-diyl bis(oxycarbonyl)]bisaniline. A part or all of hydrogen atoms on an aromatic ring of the above-described aromatic diamines may be substituted with halogen atoms; alkyl groups or alkoxyl groups having 1 to 3 carbon atoms; or cyano groups, and further a part or all of hydrogen atoms of the alkyl groups or alkoxyl groups having 1 to 3 carbon atoms may be substituted with halogen atoms. The aromatic diamines having a benzoxazole structure are not particularly limited, and examples thereof include: 5-amino-2-(p-aminophenyl)benzoxazole; 6-amino-2-(p-aminophenyl)benzoxazole; 5-amino-2-(m-aminophenyl)benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl)benzo[1,2-d:5,4-d']bisoxazole; 2,6-(4,4'-diaminodiphenyl)benzo[1,2-d:4,5-d']bisoxazole; 2,6-(3,4'-diaminodiphenyl)benzo[1,2-d:5,4-d']bisoxazole; 2,6-(3,4'-diaminodiphenyl)benzo[1,2-d:4,5-d']bisoxazole; 2,6-(3,3'-diaminodiphenyl)benzo[1,2-d:5,4-d']bisoxazole; and 2,6-(3,3'-diaminodiphenyl)benzo[1,2-d:4,5-d']bisoxazole. Among these, particularly 2,2'-ditrifluoromethyl-4,4'-diaminobiphenyl, 4-amino-N-(4-aminophenyl)benzamide, 4,4'-diaminodiphenyl sulfone, and 3,3'-diaminobenzophenone are preferable. The aromatic diamines may be used singly or a plurality of these may be used in combination.

Examples of the alicyclic diamines include 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino- 2-n-butylcyclohexane, 1,4-diamino-2-isobutylcyclohexane, 1,4-diamino-2-sec-butylcyclohexane, 1,4-diamino-2-tert-butylcyclohexane, and 4,4'-methylenebis(2,6-dimethylcyclohexylamine). Among these, particularly 1,4-diaminocyclohexane and 1,4-diamino-2-methylcyclohexane are preferable, and 1,4-diaminocyclohexane is more preferable. The alicyclic diamines may be used singly or a plurality of these may be used in combination.

Examples of the diisocyanates include aromatic diisocyanates such as diphenylmethane-2,4'-diisocyanate, 3,2'- or 3,3'- or 4,2'- or 4,3'- or 5,2'- or 5,3'- or 6,2'- or 6,3'-dimethyldiphenylmethane-2,4'-diisocyanate, 3,2'- or 3,3'- or 4,2'- or 4,3'- or 5,2'- or 5,3'- or 6,2'- or 6,3'-diethyldiphenylmethane-2,4'-diisocyanate, 3,2'- or 3,3'- or 4,2'- or 4,3'- or 5,2'- or 5,3'- or 6,2'- or 6,3'-dimethoxydiphenylmethane-2,4'-diisocyanate, diphenylmethane-4,4'-diisocyanate, diphenylmethane-3,3'-diisocyanate, diphenylmethane-3,4'-diisocyanate, diphenyl ether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylene diisocyanate, p-xylylene diisocyanate, naphthalene-2,6-diisocyanate, 4,4'-(2,2 bis(4-phenoxyphenyl)propane)diisocyanate, 3,3'- or 2,2'-dimethylbiphenyl-4,4'-diisocyanate, 3,3'- or 2,2'-diethylbiphenyl-4,4'-diisocyanate, 3,3'-dimethoxybiphenyl-4,4'-diisocyanate, and 3,3'-diethoxybiphenyl-4,4'-diisocyanate, and hydrogenated diisocyanates of any of these (for example, isophorone diisocyanate, 1,4-cyclohexane diisocyanate, 1,3-cyclohexane diisocyanate, 4,4'-dicyclohexylmethane diisocyanate, and hexamethylene diisocyanate). Among these, diphenylmethane-4,4'-diisocyanate, tolylene-2,4-diisocyanate, tolylene-2,6-diisocyanate, 3,3'-dimethylbiphenyl-4,4'-diisocyanate, naphthalene-2,6-diisocyanate, 4,4'-dicyclohexylmethane diisocyanate, and 1,4-cyclohexane diisocyanate are preferable from the viewpoint of low moisture absorption property, dimensional stability, price, and polymerizability. The diisocyanates may be used singly or a plurality of these may be used in combination.

The highly heat-resistant film of the present invention may have a single-layer configuration or a multi-layer (laminated) configuration of two or more layers. When the highly heat-resistant film has a single-layer structure, the physical properties (tensile elasticity, melting point, glass transition temperature, yellowness index, total light transmittance, haze, CTE and the like) of the highly heat-resistant film refer to the values of the entire highly heat-resistant film. When the highly heat-resistant film has a multi-layer structure, the tensile elasticity and surface roughness Ra of the highly heat-resistant film refer to the values of only the single layer that is in contact with the inorganic substrate, and other physical properties (melting point, glass transition temperature, yellowness index, total light transmittance, haze, CTE and the like) refer to the values of the entire highly heat-resistant film. Therefore, the tensile elasticity and surface roughness Ra of the layers that are not in contact with the inorganic substrate (all layers other than the layer that is in contact with the inorganic substrate) are not limited.

When the highly heat-resistant film is a highly heat-resistant transparent film, the yellowness index (hereafter, also referred to as "yellow index" or "YI") of the highly heat-resistant transparent film is preferably 10 or less, more preferably 7 or less, still more preferably 5 or less, yet still more preferably 3 or less. The lower limit of the yellowness index of the highly heat-resistant transparent film is not particularly limited, but is preferably 0.1 or more, more preferably 0.2 or more, still more preferably 0.3 or more for use as a flexible electronic device.

The light transmittance of the highly heat-resistant transparent film at a wavelength of 400 nm in the present invention is preferably 70% or more, more preferably 72% or more, still more preferably 75% or more, yet still more preferably 80% or more. The upper limit of the light transmittance of the highly heat-resistant transparent film at a wavelength of 400 nm is not particularly limited, but is preferably 99% or less, more preferably 98% or less, still more preferably 97% or less for use as a flexible electronic device.

The haze of the highly heat-resistant transparent film in the present invention is preferably 1.0 or less, more preferably 0.8 or less, still more preferably 0.5 or less, yet still more preferably 0.3 or less. The lower limit is not particularly limited, but industrially, there is no problem when the haze is 0.01 or more, and the haze may be 0.05 or more.

The polyimide film having the coefficient of linear thermal expansion (CTE) of the present invention can be realized by performing stretching in the course of forming the polyimide film. Such stretching operation can be realized by performing stretching by 1.5-fold to 4.0-fold in the MD direction and 1.4-fold to 3.0-fold in the TD direction in the course of applying a polyimide solution to a support for polyimide film fabrication, drying the solution to form a polyimide film containing a solvent at 1% to 50% by mass, and further treating the polyimide film containing a solvent at 1% to 50% by mass at a high temperature on the support for polyimide film fabrication or in a state of being peeled off from the support for drying. At this time, by stretching the thermoplastic polymer film and the polyimide film at the same time using an unstretched thermoplastic polymer film as the support for polyimide film fabrication and then peeling off the stretched polyimide film from the thermoplastic polymer film, it is possible to prevent the polyimide film from being scratched at the time of stretching in the MD direction and to obtain a polyimide film with higher quality.

The average coefficient of linear thermal expansion (CTE) of the highly heat-resistant film at between 30° C. and 250° C. is preferably 50 ppm/K or less. The CTE is more preferably 45 ppm/K or less, still more preferably 40 ppm/K or less, yet still more preferably 30 ppm/K or less, particularly preferably 20 ppm/K or less. The CTE is preferably −5 ppm/K or more, more preferably −3 ppm/K or more, still more preferably 1 ppm/K or more. When the CTE is in the above range, a small difference in coefficient of linear thermal expansion between the highly heat-resistant film and a general support (inorganic substrate) can be maintained, and the highly heat-resistant film and the inorganic substrate can be prevented from peeling off from each other or warping together with the support when being subjected to a process of applying heat as well. Here, CTE is a factor that indicates reversible expansion and contraction with respect to temperature. The CTE of the highly heat-resistant film refers to the average value of the CTE in the machine direction (MD direction) and the CTE in the transverse direction (TD direction) of the highly heat-resistant film. The method for measuring the CTE of the highly heat-resistant film is as described in Examples.

When the highly heat-resistant film has a laminated configuration of two or more layers, it is not preferable that the differences in CTE between the respective layers are different from one another since warpage is caused. Hence, the difference in CTE between a highly heat-resistant film layer that is in contact with the inorganic substrate and a highly heat-resistant film layer that is not in contact with the inorganic substrate but is adjacent to the highly heat-resistant film is preferably 40 ppm/K or less, more preferably 30 ppm/K or less, still more preferably 15 ppm/K or less. It is preferable that the layer having the thickest film thickness among the layers constituting the highly heat-resistant film laminate is within the above range. It is preferable that the highly heat-resistant film has a symmetrical structure in the film thickness direction since warpage is unlikely to occur.

When the highly heat-resistant transparent film has a laminated configuration of two or more layers, it is preferable that the highly heat-resistant transparent film layer that is in contact with the inorganic substrate contains polyimide having the structure represented by the following Formula 1 and/or the structure represented by the following Formula 2. The total amount of polyimides having the structures represented by Formulas 1 and 2 in the highly heat-resistant transparent film layer is preferably 70% by mass or more, more preferably 80% by mass or more, still more preferably 90% by mass or more, particularly preferably 95% by mass or more, and may be 100% by mass or more. By containing polyimide having the structure represented by Formula 1 and/or the structure represented by Formula 2 within the above range, the highly heat-resistant transparent film can exert an excellent CTE.

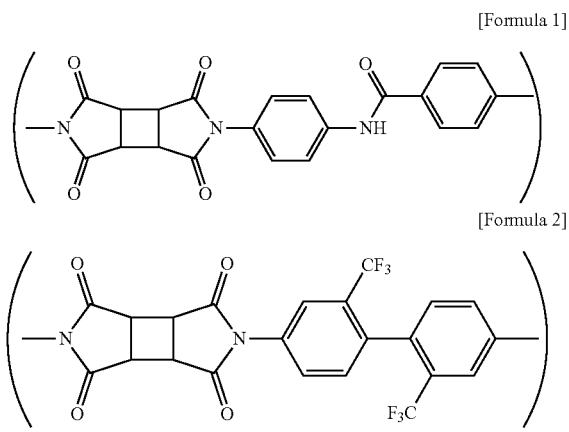

[Formula 1]

[Formula 2]

The thickness of the highly heat-resistant film in the present invention is preferably 5 μm or more, more preferably 8 μm or more, still more preferably 15 μm or more, yet still more preferably 20 μm or more. The upper limit of the thickness of the highly heat-resistant film is not particularly limited but is preferably 200 μm or less, more preferably 150 μm or less, still more preferably 90 μm or less for use as a flexible electronic device. It is difficult to fabricate and transport the film when the thickness is too thin, and it is difficult to transport the roll when the thickness is too thick.

It is required that the tensile elasticity of the highly heat-resistant film is 4 GPa or more. The tensile elasticity is preferably 5 GPa or more, more preferably 6 GPa or more. The upper limit of the tensile elasticity is not particularly limited but is about 15 GPa. When the tensile elasticity is 15 GPa or less, the highly heat-resistant film can be used as a flexible film. In a case where the tensile elasticity is 4 GPa or more, the peeling properties from the inorganic substrate is favorable, the highly heat-resistant film can be peeled off smoothly, and roughening of the surface of the inorganic substrate can be suppressed when the highly heat-resistant film is peeled from the inorganic substrate. In a case where the highly heat-resistant film has a multi-layer structure, it is required that the tensile elasticity of the single layer that is in contact with the inorganic substrate is 4 GPa. The evaluation of the physical properties of the single layer that is in contact with the inorganic substrate can be conducted by forming a single film layer having the same composition as that of the layer that is in contact with the inorganic substrate and measuring the tensile elasticity. The single film layer forming method is as described in any of Production Examples in Examples. The method for measuring the tensile elasticity of the highly heat-resistant film is as described in Examples.

Unevenness of the thickness of the highly heat-resistant film is preferably 20% or less, more preferably 12% or less, still more preferably 7% or less, particularly preferably 4% or less. When the evenness of the thickness exceeds 20%, the polyimide film tends to be hardly applied to a narrow part. Unevenness of the thickness of the highly heat-resistant film can be determined, for example, based on the following equation from the film thicknesses, which are measured at about 10 randomly extracted locations of the film to be measured using a contact-type film thickness meter.

Unevenness of thickness of film (%)=100×(maximum film thickness−minimum film thickness)÷average film thickness The highly heat-resistant film is preferably obtained in the form of being wound as a long highly heat-resistant film having a width of 300 mm or more and a length of 10 m or more at the time of production, more preferably in the form of a roll-shaped highly heat-resistant film wound around a winding core. When the highly heat-resistant film is wound in a roll shape, it is easy to transport the highly heat-resistant film in the form of a film wound in a roll shape.

In order to secure handleability and productivity of the highly heat-resistant film, a lubricant (particles) having a particle size of about 10 to 1000 nm is preferably added to/contained in the highly heat-resistant film at about 0.03% to 3% by mass to impart fine irregularities to the highly heat-resistant film surface and secure slipperiness.

In the present invention, it is particularly preferable that the highly heat-resistant transparent film has a laminated configuration (multi-layer structure) of two or more layers. By forming materials (resins) exhibiting different physical properties into a film having a two-layer configuration, it is possible to fabricate a film exhibiting various properties at the same time. Furthermore, by laminating the layers into a symmetrical structure in the thickness direction (for example, highly heat-resistant transparent film layer A/highly heat-resistant transparent film layer B/highly heat-resistant transparent film layer A), the CTE balance in the entire film is improved and the film that is unlikely to undergo warpage can be fabricated. It is conceivable to impart features to the spectral characteristics by forming any one of the layers as a layer that absorbs ultraviolet rays or infrared rays, and to control the incidence and emission of light by layers having different refractive indexes.

As a means for fabricating a film having a layer configuration of two or more layers, various methods such as simultaneous application using a T-die capable of simultaneously discharging two layers, sequential application in which one layer is applied and then the next layer is applied, a method in which one layer is applied and then dried, and then the next layer is applied, a method in which the next layer is applied after the film formation of one layer has been finished, or multilayering by heat lamination using a thermoplastic layer inserted between layers are conceivable.

However, in the present patent, various existing application methods and multilayering methods can be appropriately incorporated.

When a highly heat-resistant transparent film having a multi-layer structure is used, the thickness of the first highly heat-resistant transparent film that is in contact with the inorganic substrate is preferably 0.02 μm or more, more preferably 0.05 μm or more. By thinning the thickness of the first highly heat-resistant transparent film, the warpage of the entire film is suppressed. The thickness of the first highly heat-resistant transparent film is preferably 10 μm or less, more preferably 8 μm or less, still more preferably 5 μm or less from the viewpoint of thinning the entire highly heat-resistant transparent film.

It is required that the surface roughness Ra of the surface that is in contact with the inorganic substrate of the highly heat-resistant film in the present invention is 5 nm or less. The surface roughness Ra is preferably 4.5 nm or less, more preferably 4 nm or less. By setting the surface roughness Ra to 5 nm or less, the contact area with the inorganic substrate having a smooth surface increases and the bonding is improved. It is also easy to peel off the highly heat-resistant film from the first laminate and/or the second laminate, and the inorganic substrate can be reused. The lower limit is not particularly limited, but a surface roughness Ra of 0.01 nm or more is sufficient for use as a flexible electronic device, and the surface roughness Ra may be 0.1 nm or more. The surface roughness Ra of the highly heat-resistant film is required to be a value before lamination on the inorganic substrate, and is more preferably in the above range after peeling off from the laminate as well.

<Inorganic Substrate>

The inorganic substrate may be a plate-type substrate which can be used as a substrate made of an inorganic substance, and examples thereof include those mainly composed of glass plates, ceramic plates, semiconductor wafers, metals and the like and those in which these glass plates, ceramic plates, semiconductor wafers, and metals are laminated, those in which these are dispersed, and those in which fibers of these are contained as the composite of these.

Examples of the glass plates include quartz glass, high silicate glass (96a silica), soda lime glass, lead glass, aluminoborosilicate glass, and borosilicate glass (Pyrex®), borosilicate glass (alkali-free), borosilicate glass (microsheet), aluminosilicate glass and the like. Among these, those having a coefficient of linear thermal expansion of 5 ppm/K or less are desirable, and in the case of a commercially available product, "Corning® 7059", "Corning® 1737", and "EAGLE" manufactured by Corning Inc., "AN100" manufactured by AGC Inc., "OA10" and "OA11G" manufactured by Nippon Electric Glass Co., Ltd., "AF32" manufactured by SCHOTT AG, and the like that are glass for liquid crystal are desirable.

The semiconductor wafer is not particularly limited, but examples thereof include a silicon wafer and wafers of germanium, silicon-germanium, gallium-arsenide, aluminum-gallium-indium, nitrogen-phosphorus-arsenic-antimony, SiC, InP (indium phosphide), InGaAs, GaInNAs, LT, LN, ZnO (zinc oxide), CdTe (cadmium telluride), ZnSe (zinc selenide) and the like. Among these, the wafer preferably used is a silicon wafer, and a mirror-polished silicon wafer having a size of 8 inches or more is particularly preferable.

The metals include single element metals such as W, Mo, Pt, Fe, Ni, and Au, alloys such as Inconel, Monel, Nimonic, carbon-copper, Fe—Ni-based Invar alloy, and Super Invar alloy, and the like. Multilayer metal plates formed by adding another metal layer or a ceramic layer to these metals are also included. In this case, when the overall coefficient of linear thermal expansion (CTE) with the additional layer is low, Cu, Al and the like are also used in the main metal layer. The metals used as the addition metal layer is not limited as long as they are those that strengthen the close contact property with the highly heat-resistant film, those that exhibit properties such as no diffusion and favorable chemical resistance and heat resistance, but suitable examples thereof include Cr, Ni, TiN, and Mo-containing Cu.

Examples of the ceramic plate in the present invention include ceramics for base such as $Al_2O_3$, mullite, ALN, SiC, crystallized glass, cordierite, spodumene, Pb-BSG+Ca-ZrO3+$Al_2O_3$, crystallized glass+$Al_2O_3$, crystallized Ca-BSG, BSG+quartz, BSG+$Al_2O_3$, Pb-BSG+$Al_2O_3$, glass-ceramic, and zerodur material.

The inorganic substrate in the present invention can be used by being bonded to another highly heat-resistant film again after a highly heat-resistant film has been bonded thereto and peeled off therefrom. Components derived from the highly heat-resistant film remain on the substrate to which the highly heat-resistant film has been once bonded. Specifically, on the inorganic substrate from which the polyimide film has been peeled off, the nitrogen element component ratio by ESCA is preferably 0.2 at % or more and 12 at % or less. When the nitrogen element component ratio by ESCA is less than 0.2 at %, the inorganic substrate can be said to be substantially unused glass. Therefore, the nitrogen element component ratio is preferably 0.5 at % or more, more preferably 0.8 at % or more, still more preferably 1 at % or more. When the nitrogen element component ratio exceeds 12 at %, the amount of polyimide remaining on the inorganic substrate is large, and the surface of the inorganic substrate is roughened, and the peel strength may not be exerted even if a polyimide film having a smooth surface is bonded. Therefore, the nitrogen element component ratio is preferably 11.5 at % or less, more preferably 11 at % or less, still more preferably 10 at % or less.

It is required that the flat portion of the inorganic substrate is sufficiently flat. Specifically, it is required that the Ra value of the surface roughness of the inorganic substrate from which the highly heat-resistant film has been peeled off is 3 nm or less. The Ra value is preferably 2.5 nm or less, more preferably 2.1 nm or less. By setting the surface roughness Ra after peeling off of the highly heat-resistant film to 3 nm or less, the surface smoothness of the inorganic substrate is maintained and it is possible to reuse the inorganic substrate. In other words, the first highly heat-resistant film can be peeled off from the first laminate and then the second highly heat-resistant film can be suitably laminated. The lower limit is not particularly limited, but a Ra value of 0.1 nm or more is sufficient for use as a flexible electronic device, and the Ra value may be 0.5 nm or more. It is preferable that the surface roughness of the laminate after the second polymer film (flexible electronic device) has been peeled off from the second laminate is also within the above range. When the surface roughness is also within the above range, the laminate can be further reused. As the surface roughness of the inorganic substrate, it is only required that at least a part of the place where the highly heat-resistant film is laminated is within the above range, and it is more preferable that the entire location where the highly heat-resistant film is laminated is within the above range.

The thickness of the inorganic substrate is not particularly limited, but a thickness of 10 mm or less is preferable, a thickness of 3 mm or less is more preferable, and a thickness of 1.3 mm or less is still more preferable from the viewpoint of handleability. The lower limit of the thickness is not particularly limited but is preferably 0.07 mm or more, more preferably 0.15 mm or more, and further preferably 0.3 mm or more. When the inorganic substrate is too thin, the inorganic substrate is easily destroyed and it is difficult to handle the inorganic substrate. When the inorganic substrate is too thick, the inorganic substrate is heavy and it is difficult to handle the inorganic substrate.

<Laminate>

The laminate of the present invention is obtained by laminating the highly heat-resistant film and the inorganic substrate substantially without using an adhesive. In a case where the highly heat-resistant film has a laminated configuration of two or more layers, it is preferable that the highly heat-resistant film includes a highly heat-resistant film that is in contact with an inorganic substrate and a highly heat-resistant film layer that is not in contact with the inorganic substrate but is adjacent to the highly heat-resistant film layer. In the present invention, the laminate is a general term for the first laminate and the second laminate. The first laminate is a laminate of the first highly heat-resistant film and the inorganic substrate, and the second laminate is a laminate of the second highly heat-resistant film and the inorganic substrate (including the inorganic substrate obtained by peeling off the first highly heat-resistant film from the first laminate).

The second laminate can be obtained through (a) a step of peeling off a first highly heat-resistant film from the first laminate to obtain an inorganic substrate and (b) a step of laminating a second highly heat-resistant film on the surface on which the first highly heat-resistant film has been laminated of the inorganic substrate.

The method for peeling off the highly heat-resistant film from the inorganic substrate is not particularly limited, but a method in which the highly heat-resistant film is stripped off from the end with tweezers and the like, a method in which a cut is made in the highly heat-resistant film, a pressure sensitive adhesive tape is pasted to one side of the cut portion, and then the highly heat-resistant film is stripped off from the tape portion, a method in which one side of the cut portion of the highly heat-resistant film is vacuum-adsorbed and then the highly heat-resistant film is stripped off from that portion, and the like can be employed. When the cut portion of the highly heat-resistant film is bent with a small curvature at the time of peeling off, stress may be applied to the device at that portion and the device may be destroyed, and it is thus desirable to peel off the highly heat-resistant film in a state of having a curvature as large as possible. For example, it is desirable to strip off the polymer film while winding the polymer film on a roll having a large curvature or to strip off the polymer film using a machine having a configuration in which the roll having a large curvature is located at the peeling portion.

As the method for making a cut in the highly heat-resistant film, there are a method in which the highly heat-resistant film is cut using a cutting tool such as a cutter, a method in which the highly heat-resistant film is cut by scanning a laser and the laminate relative to each other, a method in which the highly heat-resistant film is cut by scanning a water jet and the laminate relative to each other, a method in which the highly heat-resistant film is cut while being cut a little to the glass layer using a dicing apparatus for semiconductor chips, and the like, but the method is not particularly limited. For example, when the above-described methods are employed, it is also possible to appropriately employ a method in which ultrasonic waves are superimposed on the cutting tool or a reciprocating motion, a vertical motion and the like are further added to improve the cutting performance.

It is also useful to stick another reinforcing base material to the portion to be peeled off in advance and peel off the polymer film together with the reinforcing base material.

The shape of the laminate is not particularly limited and may be square or rectangular. The shape of the laminate is preferably rectangular, and the length of the long side is preferably 300 mm or more, more preferably 500 mm or more, still more preferably 1000 mm or more. The upper limit is not particularly limited, but industrially, a length of 20000 mm or less is sufficient and the length may be 10000 mm or less.

<Adhesive>

An adhesive layer is substantially not interposed between the inorganic substrate and the highly heat-resistant film of the present invention. Here, the adhesive layer referred to in the present invention refers to a layer containing a Si (silicon) component at less than 10% as a mass ratio (less than 10% by mass). Substantially not used (not interposed) means that the thickness of the adhesive layer interposed between the inorganic substrate and the highly heat-resistant film is preferably 0.4 μm or less, more preferably 0.3 μm or less, still more preferably 0.2 μm or less, particularly preferably 0.1 μm or less, most preferably 0 μm.

<Silane Coupling Agent (SCA)>

In the laminate, it is preferable to have a layer of a silane coupling agent between the highly heat-resistant film and the inorganic substrate. In the present invention, the silane coupling agent refers to a compound containing a Si (silicon) component at 10% by mass or more. By using the silane coupling agent layer, the intermediate layer between the highly heat-resistant film and the inorganic substrate can be thinned, and thus there are effects that the amount of degassed components during heating is small, elution hardly occurs in the wet process as well, and only a trace amount of components are eluted even if elution occurs. The silane coupling agent preferably contains a large amount of silicon oxide component since the heat resistance is improved, and is particularly preferably one exhibiting heat resistance at a temperature of about 400° C. The thickness of the silane coupling agent layer is preferably less than 0.2 μm. As a range for use as a flexible electronic device, the thickness of the silane coupling agent layer is preferably 100 nm or less (0.1 μm or less), more desirably 50 nm or less, still more desirably 10 nm. When a silane coupling agent layer is normally fabricated, the thickness thereof is about 0.10 μm or less. In processes where it is desired to use as little silane coupling agent as possible, a silane coupling agent layer having a thickness of 5 nm or less can also be used. There is the possibility that the peel strength decreases or some parts are not be attached when the thickness is 1 nm or less, and it is thus desirable that the thickness of the silane coupling agent layer is 1 nm or more.

The silane coupling agent in the present invention is not particularly limited, but one having an amino group or an epoxy group is preferable. Specific examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilanevinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilylpropyl)isocyanurate, chloromethylphenetyltrimethoxysilane, and chloromethyltrimethoxysilane. Among these, preferred examples include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, aminophenyltrimethoxysilane, aminophenetyltrimethoxysilane, and aminophenylaminomethylphenetyltrimethoxysilane. When heat resistance is required in the process, a silane coupling agent, in which Si and an amino group or the like is linked to each other via an aromatic, is desirable.

It is required that the adhesive strength between the highly heat-resistant film and the inorganic substrate is 0.3 N/cm or less. This makes it remarkably easy to peel off the highly heat-resistant film from the inorganic substrate after a device is formed on the highly heat-resistant film. Hence, it is possible to manufacture a device connected body that can be produced in a large quantity and it is easy to manufacture a flexible electronic device. The adhesive strength is preferably 0.25 N/cm or less, more preferably 0.2 N/cm or less, still more preferably 0.15 N/cm or less, particularly preferably 0.1 N/cm or less. The adhesive strength is preferably 0.01 N/cm or more. The adhesive strength is more preferably 0.02 N/cm or more, still more preferably 0.03 N/cm or more, particularly preferably 0.05 N/cm or more since the laminate does not peel off when a device is formed on the highly heat-resistant film. The adhesive strength is a value of the laminate after the highly heat-resistant film and the inorganic substrate are bonded together and then heat-treated at 100° C. for 10 minutes in an atmospheric ambience (initial adhesive strength). It is preferable that the adhesive strength of a laminate obtained by further heat-treating the laminate at the time of initial adhesive strength measurement at 300° C. for 1 hour in a nitrogen ambience is also within the above range (adhesive strength after heat treatment at 300° C.).

The laminate of the present invention can be fabricated, for example, according to the following procedure. The laminate can be obtained by treating at least one surface of the inorganic substrate with a silane coupling agent in advance, superposing the surface treated with a silane coupling agent and the highly heat-resistant film, and laminating the inorganic substrate and the highly heat-resistant film by pressurization. The laminate can be obtained by treating at least one surface of the highly heat-resistant film with a silane coupling agent in advance, superposing the surface treated with a silane coupling agent and the inorganic substrate, and laminating the highly heat-resistant film and the inorganic substrate by pressurization. Examples of the pressurization method include normal pressing or lamination in the atmosphere or pressing or lamination in a vacuum. Lamination in the atmosphere is desirable in the case of a laminate having a large size (for example, more than 200 mm) in order to obtain a stable adhesive strength over the entire surface. In contrast, pressing in a vacuum is preferable in the case of a laminate having a small size of about 200 mm or less. As the degree of vacuum, a degree of vacuum obtained by an ordinary oil-sealed rotary pump is sufficient, and about 10 Torr or less is sufficient. The pressure is preferably 1 MPa to 20 MPa, still more preferably 3 MPa to 10 MPa. The substrate may be destroyed when the pressure is high, and close contact may not be achieved at some portions when the pressure is low. The temperature is preferably 90° C. to 300° C., still more preferably 100° C. to 250° C. The film may be damaged when the temperature is high, and close contact force may be weak when the temperature is low.

<Fabrication of Flexible Electronic Device>

When the laminate is used, a flexible electronic device can be easily fabricated by using existing equipment and processes for electronic device manufacture. Specifically, a flexible electronic device can be fabricated by (c) forming an electronic element or wiring (electronic device) on the highly heat-resistant film of the laminate and peeling off the electronic element or wiring (electronic device) together with the highly heat-resistant film from the laminate.

In the present specification, the electronic device refers to a wiring board which carries out electrical wiring and has a single-sided, double-sided, or multi-layered structure, electronic circuits including active devices such as transistors and diodes and passive devices such as resistors, capacitors, and inductors, sensor elements which sense pressure, temperature, light, humidity and the like, biosensor elements, light emitting elements, image display elements such as liquid crystal displays, electrophoresis displays, and self-luminous displays, wireless and wired communication elements, arithmetic elements, storage elements, MEMS elements, solar cells, thin film transistors, and the like.

In the method for manufacturing a flexible electronic device in the present specification, a device is formed on the highly heat-resistant film of the laminate fabricated by the above-described method and then the highly heat-resistant film is peeled off from the inorganic substrate.

<Peeling Off of Highly Heat-Resistant Film with Device from Inorganic Substrate>

The method for peeling off the highly heat-resistant film with device from the inorganic substrate is not particularly limited, but a method in which the highly heat-resistant film with device is stripped off from the end with tweezers and the like, a method in which a cut is made in the highly heat-resistant film, a pressure sensitive adhesive tape is pasted to one side of the cut portion, and then the highly heat-resistant film with device is stripped off from the tape portion, a method in which one side of the cut portion of the highly heat-resistant film is vacuum-adsorbed and then the highly heat-resistant film with device is stripped off from that portion, and the like can be employed. When the cut portion of the highly heat-resistant film is bent with a small curvature at the time of peeling off, stress may be applied to the device at that portion and the device may be destroyed, and it is thus desirable to peel off the highly heat-resistant film in a state of having a curvature as large as possible. For example, it is desirable to strip off the polymer film while winding the polymer film on a roll having a large curvature or to strip off the polymer film using a machine having a configuration in which the roll having a large curvature is located at the peeling portion.

As the method for making a cut in the highly heat-resistant film, there are a method in which the highly heat-resistant film is cut using a cutting tool such as a cutter, a method in which the highly heat-resistant film is cut by scanning a laser and the laminate relative to each other, a method in which the highly heat-resistant film is cut by scanning a water jet and the laminate relative to each other, a method in which the highly heat-resistant film is cut while being cut a little to the glass layer using a dicing apparatus for semiconductor chips, and the like, but the method is not particularly limited. For example, when the above-described methods are employed, it is also possible to appropriately employ a method in which ultrasonic waves are superimposed on the cutting tool or a reciprocating motion, a vertical motion and the like are further added to improve the cutting performance.

It is also useful to stick another reinforcing base material to the portion to be peeled off in advance and peel off the polymer film together with the reinforcing base material. In a case where the flexible electronic device to be peeled off is the backplane of a display device, it is also possible to obtain a flexible display device by sticking the front plane of the display device in advance, integrating these on an inorganic substrate, and then peeling off these two at the same time.

EXAMPLES

Hereinafter, the present invention will be described in detail with reference to Examples, but the present invention is not limited to the following Examples as long as the gist of the present invention is not exceeded.

Among the polyimide films bonded, commercially available ones were used as the following four kinds.
F1: UPILEX® 25S (polyimide film manufactured by UBE Corporation, thickness: 25 μm)
F2: XENOMAX® F38LR2 (polyimide film manufactured by TOYOBO CO., LTD., thickness: 38 μm)
F7: Kapton® 100H/V (polyimide film manufactured by DU PONT-TORAY CO., LTD., thickness: 25 μm) subjected to plasma treatment
F9: F2 subjected to plasma treatment
<Vacuum Plasma Treatment of Polyimide Film>

As a previous process for treating the polyimide film with a silane coupling agent, the polyimide film was subjected to vacuum plasma treatment. As the vacuum plasma treatment, the inside of the vacuum chamber was evacuated to $1 \times 10^{-3}$ Pa or less, argon gas was introduced into the vacuum chamber, and argon plasma treatment was performed for 20 seconds at a discharge power of 100 W and a frequency of 15 kHz using an apparatus for treatment of long films. By winding up the film after plasma treatment into a roll shape in the treatment apparatus, the moisture absorbed state of the film can be maintained to be substantially equivalent to the moisture absorbed state during the plasma treatment. A sample of about 10 cm square was immediately cut out from the film after plasma treatment, and the coefficient of moisture absorption was measured. As a result, the coefficient of moisture absorption of F2 was 0.21%, and the coefficient of moisture absorption of F9 was 0.28%. The coefficients of moisture absorption of F7 before and after plasma treatment were 0.20% and 0.22%, respectively.

Production Example 1 (Production of Polyimide Solution 1)

While introducing nitrogen gas into a reaction vessel equipped with a nitrogen introducing tube, a Dean-Stark tube and a reflux tube, a thermometer and a stirring bar, 19.86 parts by mass of 4,4'-diaminodiphenyl sulfone (4,4'-DDS), 4.97 parts by mass of 3,3'-diaminodiphenyl sulfone (3,3'-DDS), and 80 parts by mass of gamma-butyrolactone (GBL) were added. Subsequently, 31.02 parts by mass of 4,4'-oxydiphthalic andihydride (ODPA), 24 parts by mass of GBL, and 13 parts by mass of toluene were added at room temperature, then the temperature was raised to an internal temperature of 160° C., and the mixture was heated under reflux at 160° C. for 1 hour for imidization. After the imidization was completed, the temperature was raised to 180° C., and the reaction was continuously conducted while extracting toluene. After the reaction for 12 hours, the oil bath was removed and the temperature was returned to room temperature, GBL was added so that the solid concentration was 20% by mass, and a polyimide solution 1 having a reduced viscosity of 0.70 dl/g was thus obtained.

Production Example 2 (Production of Polyamic Acid Solution 1)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX® DMAC-ST-ZL" manufactured by Nissan Chemical Corporation) were added so that silica (lubricant) was 0.4% by mass of the total amount of polymer solids in the polyamic acid solution, and completely dissolved. Subsequently, 19.32 parts by mass of 1,2,3,4-cyclobutanetetracarboxylic andihydride (CBDA) was added dividedly in the solid form, and the mixture was stirred at room temperature for 24 hours. Thereafter, 173.1 parts by mass of DMAc was added for dilution, thereby obtaining a polyamic acid solution 1 having a solid content (NV) of 10% by mass and a reduced viscosity of 3.10 dl/g.

Production Example 3 (Production of Polyamic Acid Solution 2)

The inside of a reaction vessel equipped with a nitrogen introducing tube, a reflux tube, and a stirring bar was purged with nitrogen, then 32.02 parts by mass of 2,2'-bis(trifluoromethyl)benzidine (TFMB), 252.1 parts by mass of N,N-dimethylacetamide (DMAc), and a dispersion obtained by dispersing colloidal silica as a lubricant in dimethylacetamide ("SNOWTEX® DMAC-ST-ZL" manufactured by Nissan Chemical Corporation) were added so that silica (lubricant) was 0.4% by mass of the total amount of polymer solids in the polyamic acid solution, and completely dissolved. Subsequently, 19.61 parts by mass of 1,2,3,4-cyclobutanetetracarboxylic andihydride (CBDA) was added dividedly in the solid form, and the mixture was stirred at room temperature for 24 hours. Thereafter, 165.7 parts by mass of DMAc was added for dilution, thereby obtaining a polyamic acid solution 2 having a solid content (NV) of 11% by mass and a reduced viscosity of 3.50 dl/g.

Production Example 4 (Fabrication of Polyimide Film F3)

The polyamic acid solution 1 obtained in Production Example 2 was adjusted and applied onto the lubricant-free surface of polyethylene terephthalate film A4100 (manufactured by TOYOBO CO., LTD.) using a comma coater so that the final film thickness was 15 μm. The polyethylene terephthalate film A04100 was allowed to pass through a hot air furnace, wound up, and dried at 100° C. for 10 minutes at this time. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, and at 300° C. for 6 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F3 having a width of 450 mm by 500 m.

Production Example 5 (Fabrication of Polyimide Film F4)

The polyamic acid solution 1 obtained in Production Example 2 was adjusted and applied onto the lubricant-free surface of polyethylene terephthalate film A04100 (manufactured by TOYOBO CO., LTD.) using a comma coater so that the final film thickness was 0.3 μm. The polyethylene terephthalate film A04100 was allowed to pass through a hot air furnace, wound up, and dried at 100° C. for 10 minutes at this time. This was wound up and then set again on the comma coater side, and subsequently the polyimide solution 1 obtained in Production Example 1 was applied onto the dried product of the polyamic acid solution 1 so that the final film thickness was 25 μm. This was dried at 100° C. for 10 minutes. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, and at 300° C. for 6 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F4 having a width of 450 mm by 500 m.

Production Example 6 (Fabrication of Polyimide Film F5)

A polyimide film F5 was obtained by performing the same operation as that at the time of fabrication of the polyimide film F4 in Production Example 5 except that the polyamic acid solution 1 obtained in Production Example 2 was changed to the polyamic acid solution 2 obtained in Production Example 3.

Production Example 7 (Fabrication of Polyimide Film F6)

The polyamic acid solution 1 obtained in Production Example 2 was adjusted and applied onto the lubricant-free surface of polyethylene terephthalate film A4100 (manufactured by TOYOBO CO., LTD.) using a comma coater so that the final film thickness was 1 μm. This was dried at 90° C. to 110° C. for 10 minutes. This was wound up and then set again on the comma coater side, and subsequently the polyimide solution 1 obtained in Production Example 1 was applied onto the dried product of the polyamic acid solution 1 so that the final film thickness was 20 μm. This was dried at 90° C. to 110° C. for 10 minutes. This was wound up and then set again on the comma coater side, and subsequently the polyamic acid solution 1 obtained in Production Example 2 was applied onto the dried product of the polyimide solution 1 so that the final film thickness was 20 μm. This was dried at 90° C. to 110° C. for 10 minutes. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, and at 300° C. for 6 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F6 having a width of 450 mm by 500 m.

Production Example 8 (Fabrication of Polyimide Film F8)

A polyimide film F8 was obtained by performing the same operation as that at the time of fabrication of the polyimide film F3 in Production Example 4 except that the polyamic acid solution 1 obtained in Production Example 2 was changed to the polyimide solution 1 obtained in Production Example 1 and the final thickness was changed to 25 μm.

<Measurement of Thickness of Highly Heat-Resistant Film>

The thickness of the polyimide films F1 to F9 was measured using a micrometer (Millitron 1245D manufactured by Feinpruf GmbH). The results are presented in Table 1.

<Tensile Elasticity of Highly Heat-Resistant Film>

The polyimide films F1 to F9 were cut into a strip shape of 100 mm×10 mm in the machine direction (MD direction) and the transverse direction (TD direction) respectively to be used as test pieces. The tensile elasticity in the MD direction and the TD direction were measured respectively at a tensile speed of 50 mm/min and a distance between chucks of 40 mm using a tensile tester (Autograph Model Name: AG-5000A manufactured by Shimadzu Corporation). The results are presented in Table 1.

<Coefficient of Linear Thermal Expansion (CTE) of Highly Heat-Resistant Film>

The expansion/contraction rate of the polyimide films F1 to F9 in the machine direction (MD direction) and the transverse direction (TD direction) was measured under the following conditions, the expansion/contraction rate/temperature was measured at intervals of 15° C., such as 30° C. to 45° C. and 45° C. to 60° C., this measurement was performed up to 300° C., and the average value of all measured values was calculated as CTE. The results are presented in Table 1.

Device name: TMA4000S produced by MAC Science Corporation
Length of sample: 20 mm
Width of sample: 2 mm
Start temperature in temperature increase: 25° C.
End temperature in temperature increase: 300° C.
Rate of temperature increase: 5° C./min
Ambience: Argon <Total Light Transmittance>

The total light transmittance (TT) of the films was measured using HAZEMETER (NDH5000 manufactured by NIPPON DENSHOKU INDUSTRIES CO., LTD.). A D65 lamp was used as the light source. The same measurement was performed 3 times and the arithmetic mean value thereof was adopted.

<Yellow Index (YI)>

Using a color meter (ZE6000 manufactured by NIPPON DENSHOKU INDUSTRIES CO., LTD.) and a C2 light source, the tristimulus values, XYZ values of the films were measured in conformity with ASTM D1925, and the yellow index (YI) was calculated by the following equation. The same measurement was performed 3 times and the arithmetic mean value thereof was adopted.

$$YI = 100 \times (1.28X - 1.06Z)/Y$$

<Haze>

The haze of the films was measured using HAZEMETER (NDH5000 manufactured by NIPPON DENSHOKU INDUSTRIES CO., LTD.). A D65 lamp was used as the light source. The same measurement was performed 3 times and the arithmetic mean value thereof was adopted.

<Surface Roughness Ra>

The surface roughness (Ra) of the films was evaluated using an atomic force microscope (AFM). The film was fixed on the observation stage, and the surface roughness in the area of 5 μm square was calculated. The measurement was performed at a total of 5 points of the center and four corners in the place in contact with the inorganic substrate, and the average value thereof was used as Ra. The same applies to the Ra measurement place of the inorganic substrate. With regard to the measurement of the inorganic substrate, the value after ultrasonic cleaning with pure water was taken as Ra. BRANSON 3200 was used for ultrasonic cleaning, and the cleaning time was set to 3 minutes.

<Nitrogen Element Component Ratio>

The inorganic substrate before bonding of the highly heat-resistant film and after ultrasonic cleaning with pure water was analyzed in a range of 50 mm×50 mm by ESCA, and the proportion of nitrogen element present on the peeled surface of the inorganic substrate was evaluated. K-Alpha$^+$ (manufactured by Thermo Fisher Scientific Inc.) was used as the instrument. The measurement conditions are as follows. At the time of analysis, the background was removed by the shirley method. The surface composition ratio was the average value of the measurement results at three or more places.

Measurement Conditions
Excited X-rays: Monochrome Al Kα rays
X-ray output: 12 kV, 6 mA
Photoelectron escape angle: 90°
Spot size: 400 μmφ
Path energy: 50 eV
Step: 0.1 eV Example 1

The method for coating a glass substrate with a silane coupling agent was carried out using an experimental apparatus illustrated in FIG. 1. FIG. 1 is a schematic diagram of an apparatus for coating a glass substrate with a silane coupling agent. A glass substrate 1 (0.7 mm thick OA11G glass cut into a size of 100 mm×100 mm (manufactured by NEG Co., Ltd.)) was used. The glass substrate was washed with pure water, dried, and then irradiated using a UV/O$_3$ irradiator (SKR1102N-03 manufactured by LANTECHNICAL SERVICE CO., LTD.) for 1 minute for dry cleaning. Into a chemical tank having a capacity of 1 L, 150 g of 3-aminopropyltrimethoxysilane (silane coupling agent, Shin-Etsu Chemical KBM903) was put, and the outer water bath of this chemical tank was warmed to 43° C. The vapor that came out was then sent to the chamber together with clean dry air. The gas flow rate was set to 25 L/min and the substrate temperature was set to 24° C. The temperature of clean dry air was 23° C. and the humidity thereof was 1.2% RH. Since the exhaust is connected to the exhaust port having a negative pressure, it is confirmed that the chamber has a negative pressure of about 10 Pa by a differential pressure gauge.

Next, the polyimide film F1 (size: 70 mm×70 mm) was bonded on the silane coupling agent layer to obtain a laminate. A laminator manufactured by MCK CO., LTD. was used for bonding, and the bonding conditions were set to compressed air pressure: 0.6 MPa, temperature: 22° C., humidity: 55% RH, and lamination speed: 50 mm/sec. This F1/glass laminate was heated at 110° C. for 10 minutes, and the 90° peel strength between F1 and glass was measured. After that, the glass was ultrasonically cleaned with pure water, and the silane coupling agent was applied again and F1 was bonded again. The second F1 bonded surface is the same surface as the first F1 bonded surface.

Example 2

A laminate was obtained in the same manner as in Example 1 except that the highly heat-resistant film used was changed from film F1 to film F2.

Example 3

A laminate was obtained in the same manner as in Example 1 except that the highly heat-resistant film to be bonded first was film F2 and the film to be bonded second was F1.

Example 4

A laminate was obtained in the same manner as in Example 1 except that the highly heat-resistant film used was changed from film F1 to film F3.

Example 5

A laminate was obtained in the same manner as in Example 1 except that the highly heat-resistant film used was changed from film F1 to film F4. At this time, the surface bonded to the glass substrate is a polyimide surface formed from the polyamic acid solution 1.

Example 6

A laminate was obtained in the same manner as in Example 1 except that the highly heat-resistant film used was changed from film F1 to film F5. At this time, the surface bonded to the glass substrate is a polyimide surface formed from the polyamic acid solution 2.

Example 7

A laminate was obtained in the same manner as in Example 1 except that the highly heat-resistant film used was changed from film F1 to film F6.

Comparative Example 1

A laminate was obtained in the same manner as in Example 1 except that the highly heat-resistant film used was changed from film F1 to film F7. The surface roughness Ra of the film F7 is large, and the adhesive strength with the inorganic substrate is high. The surface roughness Ra of the inorganic substrate after peeling off of the film F7 was also large, and the inorganic substrate could not be reused.

Comparative Example 2

A laminate was obtained in the same manner as in Example 1 except that the highly heat-resistant film used was changed from film F1 to film F8. The surface roughness Ra of the inorganic substrate after peeling off of the film F8 was large, and the inorganic substrate could not be reused.

Comparative Example 3

A laminate was obtained in the same manner as in Example 1 except that the highly heat-resistant film used was changed from film F1 to film F9. The adhesive strength between the film F9 and the inorganic substrate is high. The surface roughness Ra of the inorganic substrate after peeling off of the film F9 was also large, and the inorganic substrate could not be reused.

Reference Example 1

The film F2 was used as the first highly heat-resistant film, and an inorganic substrate having a surface nitrogen content of 14 at % were used. Ra of the inorganic substrate was large, and it was difficult to bond F2 to the inorganic substrate.

<Measurement of 90° Adhesive Strength (Peel Strength)>

The laminates obtained in the above-described fabrication of laminate were subjected to heat treatment at 100° C. for 10 minutes in an atmospheric ambience. Thereafter, the 90° peel strength between the glass substrate and the polyimide film was measured. The results are presented in Table 1.

The measurement conditions for 90° initial peel strength are as follows.

The film is peeled off from the inorganic substrate at an angle of 90°.

The measurement is performed 5 times and the average value thereof is taken as the measured value.

Measuring instrument: Autograph AG-IS manufactured by Shimadzu Corporation
Measured temperature: Room temperature (25° C.)
Peeling speed: 100 mm/min
Ambience: Atmosphere
Width of measured sample: 2.5 cm

TABLE 1

| | Example 1 | Example 2 | Example 3 | Example 4 | Example 5 | Example 6 | Example 7 | Comparative Example 1 | Comparative Example 2 | Comparative Example 3 | Reference Example 1 |
|---|---|---|---|---|---|---|---|---|---|---|---|
| First highly heat-resistant film | | | | | | | | | | | |
| Film | F1 | F2 | F2 | F3 | F4 | F5 | F6 | F7 | F8 | F9 | F2 |
| Thickness (μm) | 25 | 38 | 38 | 15 | 26 | 28 | 22 | 25 | 25 | 15 | 38 |
| CTE (ppm) | 12 | 2 | 2 | 17 | 45 | 48 | 35.5 | 28 | 48 | 2 | 2 |
| Total light transmittance | — | — | — | 87.3 | 87.6 | 87.6 | 85.9 | — | | | — |
| YI | — | — | — | 3.5 | 4.7 | 3.2 | 5.9 | — | | | — |
| Haze | — | — | — | 0.9 | 0.3 | 0.5 | 0.5 | — | | | — |
| Tensile elasticity of entire first highly heat-resistant film laminated on inorganic substrate (GPa) | 9.1 | 8.5 | 8.5 | 6.6 | 3.1 | 3.7 | 4 | 3.3 | 3.3 | 8.5 | 8.5 |
| Tensile elasticity of layer in contact with inorganic substrate of first highly heat-resistant film (GPa) | 9.1 | 8.5 | 8.5 | 6.6 | 6.6 | 5.1 | 6.6 | 3.3 | 3.3 | 8.5 | 8.5 |
| Atomic percentage of nitrogen on surface of inorganic substrate before bonding of first highly heat-resistant film | 1.8 | 2.1 | 2 | 2.4 | 5 | 1.8 | 4.3 | 1.5 | 2 | 1.1 | 14 |
| Peel strength with inorganic substrate (N/cm) | 0.23 | 0.1 | 0.1 | 0.04 | 0.08 | 0.11 | 0.08 | 4.1 | 0.08 | 4.8 | — |
| Ra of surface in contact with inorganic substrate of first highly heat-resistant film (nm) | 2.1 | 0.3 | 0.3 | 4 | 4 | 4 | 5 | 42 | 2 | 0.3 | 0.3 |
| Ra of inorganic substrate after peeling off of first highly heat-resistant film (nm) | 2.1 | 1.7 | 1.6 | 1.3 | 1.7 | 1.9 | 1.5 | 10 | 14 | 23 | 20 |
| Second highly heat-resistant film | | | | | | | | | | | |
| Film | F1 | F2 | F1 | F3 | F4 | F5 | F3 | F7 | F2 | F2 | — |
| Total light transmittance | — | — | — | 87.3 | 87.6 | 87.6 | 87.3 | — | — | — | — |
| YI | — | — | — | 3.5 | 4.7 | 3.2 | 3.5 | — | — | — | — |
| Haze | — | — | — | 0.9 | 0.3 | 0.5 | 0.9 | — | — | — | — |
| Tensile elasticity of entire second highly heat-resistant film laminated on inorganic substrate (GPa) | 9.1 | 8.5 | 9.1 | 6.6 | 3.1 | 3.7 | 6.6 | 3.3 | 8.5 | 8.5 | — |
| Tensile elasticity of layer in contact with inorganic substrate of second highly heat-resistant film (GPa) | 9.1 | 8.5 | 9.1 | 6.6 | 6.6 | 5.1 | 6.6 | 3.3 | 8.5 | 8.5 | — |

TABLE 1-continued

|  | Example 1 | Example 2 | Example 3 | Example 4 | Example 5 | Example 6 | Example 7 | Comparative Example 1 | Comparative Example 2 | Comparative Example 3 | Reference Example 1 |
|---|---|---|---|---|---|---|---|---|---|---|---|
| Atomic percentage of nitrogen on surface of inorganic substrate before bonding of second highly heat-resistant film | 2 | 3.1 | 7.1 | 10.5 | 11.1 | 9.8 | 10.3 | 17 | 3.3 | 16 | — |
| Peel strength with inorganic substrate (N/cm) | 0.21 | 0.09 | 0.08 | 0.06 | 0.08 | 0.09 | 0.06 | 0 | 0 | 0 | — |
| Ra of surface in contact with inorganic substrate of second highly heat-resistant film (nm) | 2.1 | 0.3 | 2.1 | 5 | 4 | 4 | 5 | 42 | 0.3 | 0.3 | — |
| Ra of inorganic substrate after peeling off of second highly heat-resistant film (nm) | 2.0 | 1.8 | 2.0 | 1.7 | 2.0 | 1.8 | 1.7 | — | — | — | — |

DESCRIPTION OF REFERENCE SIGNS

1 Flow meter
2 Gas inlet
3 Chemical tank (silane coupling agent tank)
4 Hot water tank (water bath)
5 Heater
6 Processing chamber (chamber)
7 Base material
8 Exhaust port

The invention claimed is:

1. A first laminate of a first highly heat-resistant film and an inorganic substrate, wherein an adhesive is not substantially used and the first laminate has the following features (1) to (5):
   (1) a tensile elasticity of the first highly heat-resistant film is 4 GPa or more;
   (2) an adhesive strength between the first highly heat-resistant film and the inorganic substrate is 0.3 N/cm or less;
   (3) a surface roughness Ra of a surface in contact with the inorganic substrate of the first highly heat-resistant film is 5 nm or less;
   (4) a surface roughness Ra of a surface of the inorganic substrate after the first highly heat-resistant has been peeled off film from the first laminate is 3 nm or less; and
   (5) a nitrogen element component ratio on a surface to be bonded to the first highly heat-resistant film of the inorganic substrate is 0.2 at % or more and 12 at % or less.

2. The first laminate according to claim 1, wherein a CTE of the first highly heat-resistant film is 50 ppm/K or less.

3. A method for manufacturing a second laminate, the method comprising:
   (a) a step of peeling off a first highly heat-resistant film from the first laminate according to claim 1 to obtain an inorganic substrate; and
   (b) a step of laminating a second highly heat-resistant film on a surface on which the first highly heat-resistant film has been laminated of the inorganic substrate to obtain a second laminate, wherein the method has the following features (1) to (5):
   (1) a tensile elasticity of the second highly heat-resistant film is 4 GPa or more;
   (2) an adhesive strength between the second highly heat-resistant film and the inorganic substrate is 0.3 N/cm or less;
   (3) a surface roughness Ra of a surface in contact with the inorganic substrate of the second highly heat-resistant film is 5 nm or less;
   (4) a surface roughness Ra of a surface of the inorganic substrate after the second highly heat-resistant has been peeled off film from the second laminate is 3 nm or less; and
   (5) a nitrogen element component ratio on a surface to be bonded to the second highly heat-resistant film of the inorganic substrate is 0.2 at % or more and 12 at % or less.

4. The method for manufacturing a second laminate according to claim 3, wherein a CTE of the second highly heat-resistant film is 50 ppm/K or less.

* * * * *